United States Patent
Callan et al.

(10) Patent No.: US 9,990,568 B2
(45) Date of Patent: Jun. 5, 2018

(54) METHOD OF CONSTRUCTION OF ANOMALY MODELS FROM ABNORMAL DATA

(71) Applicant: GE Aviation Systems Limited, Chandlers Ford (GB)

(72) Inventors: Robert Edward Callan, Chandlers Ford (GB); David Stephen Hardwick, Hants (GB)

(73) Assignee: GE AVIATION SYSTEMS LIMITED, Glouchestershire (GB)

( * ) Notice: Subject to any disclaimer, the term of this patent is extended or adjusted under 35 U.S.C. 154(b) by 0 days. days.

(21) Appl. No.: 15/100,612

(22) PCT Filed: Nov. 29, 2013

(86) PCT No.: PCT/GB2013/053157
§ 371 (c)(1),
(2) Date: May 31, 2016

(87) PCT Pub. No.: WO2015/079192
PCT Pub. Date: Jun. 4, 2015

(65) Prior Publication Data
US 2016/0300126 A1    Oct. 13, 2016

(51) Int. Cl.
G06K 9/66    (2006.01)
G06K 9/62    (2006.01)

(52) U.S. Cl.
CPC ............ *G06K 9/66* (2013.01); *G06K 9/6215* (2013.01); *G06K 9/6257* (2013.01);
(Continued)

(58) Field of Classification Search
CPC .. G06K 9/6215; G06K 9/6257; G06K 9/6259; G06K 9/6296; G06K 9/66
See application file for complete search history.

(56) References Cited

U.S. PATENT DOCUMENTS 6,246,985 B1 * 6/2001 Kanevsky ............... H04L 45/00
                                                  340/7.2
9,754,041 B2 * 9/2017 Davis .................. G06F 17/3089
(Continued)

FOREIGN PATENT DOCUMENTS

EP    1703372 A1    9/2006
GB    2496386 A     5/2013

OTHER PUBLICATIONS

Patcha et al: "An Overview of Anomaly Detection Techniques: Existing Solutions and Latest Tecnological Trends", Computer Networks, Elsevier Science Publishers B.V. Jun. 19, 2007.

*Primary Examiner* — Edward Park
(74) *Attorney, Agent, or Firm* — General Electric Company

(57) ABSTRACT

A method (100) of constructing a probabilistic graphical model (10) of a system from data that includes both normal and anomalous data includes the step of learning parameters of a structure for the probabilistic graphical model (10). The structure includes at least one latent variable (26) on which other variables (12, 14, 16, 18, 20, 22, 24) are conditional, and has a plurality of components. The method further includes the steps of: iteratively associating one or more of the plurality of components of the latent variable (26) with normal data; constructing a matrix of the associations; detecting abnormal components of the latent variable (26) based on one of a low association with the normal data or the matrix of associations; and deleting the abnormal components of the latent variable (26) from the probabilistic graphical model (10).

17 Claims, 2 Drawing Sheets

(52) U.S. Cl.
CPC ......... *G06K 9/6259* (2013.01); *G06K 9/6284* (2013.01); *G06K 9/6296* (2013.01)

(56) References Cited

U.S. PATENT DOCUMENTS

| | | | |
|---|---|---|---|
| 2009/0216790 A1* | 8/2009 | Dexter | G06F 17/24 |
| 2009/0299945 A1* | 12/2009 | Hangartner | G06N 5/02 |
| | | | 706/50 |
| 2011/0153542 A1* | 6/2011 | Merugu | G06Q 10/06 |
| | | | 706/52 |
| 2012/0209880 A1 | 8/2012 | Callan et al. | |
| 2013/0110271 A1* | 5/2013 | Fornell | G06F 17/18 |
| | | | 700/104 |
| 2014/0058723 A1* | 2/2014 | Shen | G06F 17/2785 |
| | | | 704/9 |

\* cited by examiner

METHOD OF CONSTRUCTION OF ANOMALY MODELS FROM ABNORMAL DATA

BACKGROUND

The detection of abnormal behavior from data is a requirement of many applications. For example, abnormal behavior can indicate such things as a problem with a mechanical asset, a network attack, an intensive care patient in need of immediate attention, or a fraudulent transaction, etc.

Ideally developed on historical data that are known to be 'normal,' analytic models are built to detect abnormal behavior. However, there are many applications where historical data cannot be cleaned of anomalies. Such is the case when anomalous behavior has previously gone undetected and there has been no reason to take a retrospective look at the data. For example, consider a rotorcraft fitted with a health monitoring system that includes vibration sensors and magnetic debris detectors. An alert due to a magnetic-plug detection may result in replacement of the transmission. However, if the health monitoring system does not associate the alert with the vibration sensors, it may not tag the vibration data as abnormal. In other words, a health monitoring system may assume the vibration data are normal even though there could be evidence of abnormal behavior.

One may describe the detection of an anomaly or abnormal event using a priori knowledge. For example, consider a patient with a high temperature. A univariate measured feature such as a patient's temperature and knowledge of the patient's normal temperature response is sufficient to set a simple rule for detecting high temperature. Usually there is an assumption that the measured temperature is conditioned on the patient being in a restful state (e.g. not performing stressful exercise). For many scenarios there is no prior knowledge to define abnormal events (or states). Furthermore the definition of an abnormal event might require multivariate features. For example, detecting whether a person is overweight requires the features of height and weight. Multiple features commonly depend upon each other and these dependencies may vary (or be conditioned) on factors such as the current state of the observed object. For example, an aircraft may collect data during take-off, climb, cruise, etc. and the resulting data and its interrelated features can end up being very complicated. For applications that store historical data, it is often possible to construct models for anomaly detection by learning those models directly from the data. Often called a data-driven modeling approach, the general concept is to learn a model of 'normal' behavior from histories of past behavior.

BRIEF DESCRIPTION

One aspect of the invention relates to a method of constructing a probabilistic graphical model of a system from data that includes both normal and anomalous data. The method comprises: learning parameters of a structure for the probabilistic graphical model wherein the structure includes at least one latent variable on which other variables are conditional, and having a plurality of components; iteratively associating one or more of the plurality of components of the latent variable with normal data; constructing a matrix of the associations; detecting abnormal components of the latent variable based on one of a low association with the normal data or the matrix of associations; and deleting the abnormal components of the latent variable from the probabilistic graphical model.

DETAILED DESCRIPTION

Figure 1:
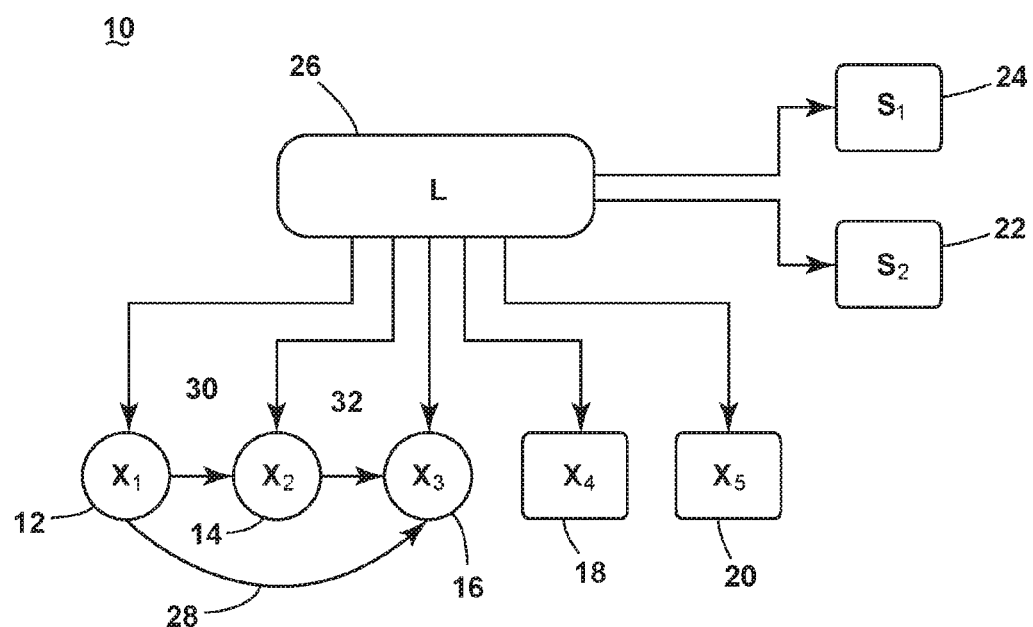
FIG. 1 shows an example probabilistic graphical model of data on which the inventive method may be applied.

In the background and the following description, for the purposes of explanation, numerous specific details are set forth in order to provide a thorough understanding of the technology described herein. It will be evident to one skilled in the art, however, that the exemplary embodiments may be practiced without these specific details. In other instances, structures and devices are shown in diagram form in order to facilitate description of the exemplary embodiments.

The exemplary embodiments are described with reference to the drawings. These drawings illustrate certain details of specific embodiments that implement a module, method, or computer program product described herein. However, the drawings should not be construed as imposing any limitations that may be present in the drawings. The method and computer program product may be provided on any machine-readable media for accomplishing their operations. The embodiments may be implemented using an existing computer processor, or by a special purpose computer processor incorporated for this or another purpose, or by a hardwired system.

As noted above, embodiments described herein may include a computer program product comprising machine-readable media for carrying or having machine-executable instructions or data structures stored thereon. Such machine-readable media can be any available media, which can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium that can be used to carry or store desired program code in the form of machine-executable instructions or data structures and that can be accessed by a general purpose or special purpose computer or other machine with a processor. When information is transferred or provided over a network or another communication connection (either hardwired, wireless, or a combination of hardwired or wireless) to a machine, the machine properly views the connection as a machine-readable medium. Thus, any such a connection is properly termed a machine-readable medium. Combinations of the above are also included within the scope of machine-readable media. Machine-executable instructions comprise, for example, instructions and data, which cause a general purpose computer, special purpose computer, or special purpose processing machines to perform a certain function or group of functions.

Embodiments will be described in the general context of method steps that may be implemented in one embodiment by a program product including machine-executable instructions, such as program codes, for example, in the form of program modules executed by machines in networked environments. Generally, program modules include routines, programs, objects, components, data structures, etc. that have the technical effect of performing particular tasks or implement particular abstract data types. Machine-executable instructions, associated data structures, and program modules represent examples of program codes for executing steps of the method disclosed herein. The particular sequence of such executable instructions or associated data structures represent examples of corresponding acts for implementing the functions described in such steps.

Embodiments may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the internet and may use a wide variety of different communication protocols. Those skilled in the art will appreciate that such network computing environments will typically encompass many types of computer system configurations, including personal computers, hand-held devices, multiprocessor systems, microprocessor-based or programmable consumer electronics, network PCs, minicomputers, mainframe computers, and the like.

Embodiments may also be practiced in distributed computing environments where tasks are performed by local and remote processing devices that are linked (either by hardwired links, wireless links, or by a combination of hardwired or wireless links) through a communication network. In a distributed computing environment, program modules may be located in both local and remote memory storage devices.

An exemplary system for implementing the overall or portions of the exemplary embodiments might include a general purpose computing device in the form of a computer, including a processing unit, a system memory, and a system bus, that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD-ROM or other optical media. The drives and their associated machine-readable media provide nonvolatile storage of machine-executable instructions, data structures, program modules and other data for the computer.

Beneficial effects of the method disclosed in the embodiments include dramatic reduction of the build time for many model types. Models whose build times for a state of the art desktop computer may range up to several days may have build times reduced to several hours. Additional time savings are realized by using techniques known for parallel processing.

Probabilistic Graphical Models (PGMs) provide a graph-based representation of the conditional dependence structure between random variables. Further described by C. M. Bishop in Chapter 8 of Pattern Recognition and Machine Learning, Springer, (2006), PGMs are probabilistic models but their structure can be visualized which allows independence properties to be deduced by inspection. Variables (such as features) are represented by nodes and associations between variables represented by edges. To aid in the detection of abnormal (or anomalous) behavior, PGMs may represent the normal behavior of an observed system.

Via machine learning techniques, a PGM can learn a density model for the data such that data representing normal behavior occupy dense regions while data occupying regions of sparse density are candidates for abnormal behavior. A PGM may include both continuous and discrete features. A continuous feature is an analog input such as temperature and a discrete feature is a countable feature such as a component identifier. As is apparent to those of ordinary skill in the art, continuous features can be made discrete. Continuous features are typically represented by Gaussian variables in a PGM and discrete features by multinomial variables.

PGMs provide a highly flexible structure for inference. They can be used to: predict class membership; infer the values of one or more features from the values of one or other features; measure the association between a set of features and the model (known as the likelihood score); and calculate probabilities, joint distributions and other derived measures. Furthermore, PGMs allow inference when data are missing such as when one of the system inputs includes a failed sensor.

Referring now to FIG. 1, an example PGM structure 10 is shown. The particular structure of the model may vary depending upon the particular instance of the model. That is, the modeled application determines the actual predefined structure of the PGM. Circular nodes 12, 14, 16 are used to denote continuous variables (or features) and rectangular nodes 18, 20, 22, 24, 26 are used to denote discrete variables (or features). The model will contain one or more features denoted by X, where i indexes individual features. These features can be continuous or discrete. A 1 features are conditional on a latent variable L 26, described below. All discrete features are assumed to be conditionally independent when the value of L 26 is known.

Continuous features 12, 14, 16 can be linked to represent dependencies 28, 30, 32. For example, if $X_1$, 12 and $X_2$, 14 are correlated, they would be linked 30. The linking of continuous variables must maintain a structure that is a directed and acyclic graph. In other words, a path cannot be drawn from a node back to itself by following the directions of edges.

The variable L 26 is known as a latent or hidden variable because its value is generally not observed. The values of L 26 are referred to as 'components.' The purpose of L 26 is to allow the features to be conditioned on different data modes. The variable L 26 allows the model to represent a complex density landscape.

Different modes in the data can occur for many reasons. If the application involves mechanical assets, then different modes can appear due to differences in: physical configuration; acquisition regimes; environment factors (e.g. hot versus cold climate); etc. The S variables, 22, 24 are known as subset variables and are used to explicitly describe expected modes.

The directions of the edges between L 26 and the subset variables, S 22, 24 should be shown in reverse because L 26 is conditional on the subset variables, S 22, 24. However, it is more convenient to have the edges directed as shown. The results from inference will be correct but model training has to follow a specific procedure. If the edges were directed from the subset variables, S 22, 24 to L 26, the entries in L 26 would be computationally unmanageable. For example, suppose $S_1$ 24 has 20 values, $S_2$ 22 has 30 values and L 26 has 50 values. If the edges pointed to L 26 there would be 30,000 entries in L 26 (i.e. 20×30×50) as opposed to 50 when drawn as shown. FIG. 1 shows two subset variables, S 22, 24 but there may be none, one or many. For example, consider an application to monitor transmission vibration in a fleet of rotorcraft. The vibration signatures can vary significantly between aircraft creating distinct modes. It may be preferable therefore to add a subset variable representing aircraft tail number. Therefore, the number of values in the subset variable would correspond to the number of aircraft in the fleet.

The variable L 26 can be viewed as specifying partitions (or subset models) in the training data. The number of partitions is equivalent to the product of values in the subset variables, S 22, 24. For example, for a fleet of 20 rotorcraft, the number of partitions is 20. With the addition of a second subset variable to condition on regime such as hover and cruise, the number of partitions is 40. Typically, the values in L 26 are hard assigned to a subset; that is, values are dedicated and trained only on data associated with a specific subset model. Alternatively, values may be shared across subsets. The number of L values assigned to a subset can vary by subset. For example, a single value in L may represent one subset, whereas 20 values may represent another subset. Further complicating the model training process, the number of values per subset may vary due to optimization during training.

A system may build a model from training data containing anomalies by assuming that the training anomalies appear in areas of the feature space represented by values of L. In other words, there will be values of L to which training anomalies will be most closely associated and these values of L will have a low association with normal data. A model of normality is then generated by detecting these 'anomalous' L values and deleting them from the model. While previous patent applications have disclosed methods of generating models by partitioning data into multiple subsets (U.S. application Ser. No. 13/027,829) and concepts relating to the utility of the graphical models (UK Patent Application 1119241.6.), a key aspect of the method of an embodiment of the invention is the efficient removal of 'anomalous' L which may be the most time consuming phase of the model building process.

Model building consists of two phases. The subset model parameters are learned during the first phase. The second phase includes removing components (or values) from L that are likely to be associated with anomalies.

Figure 2:
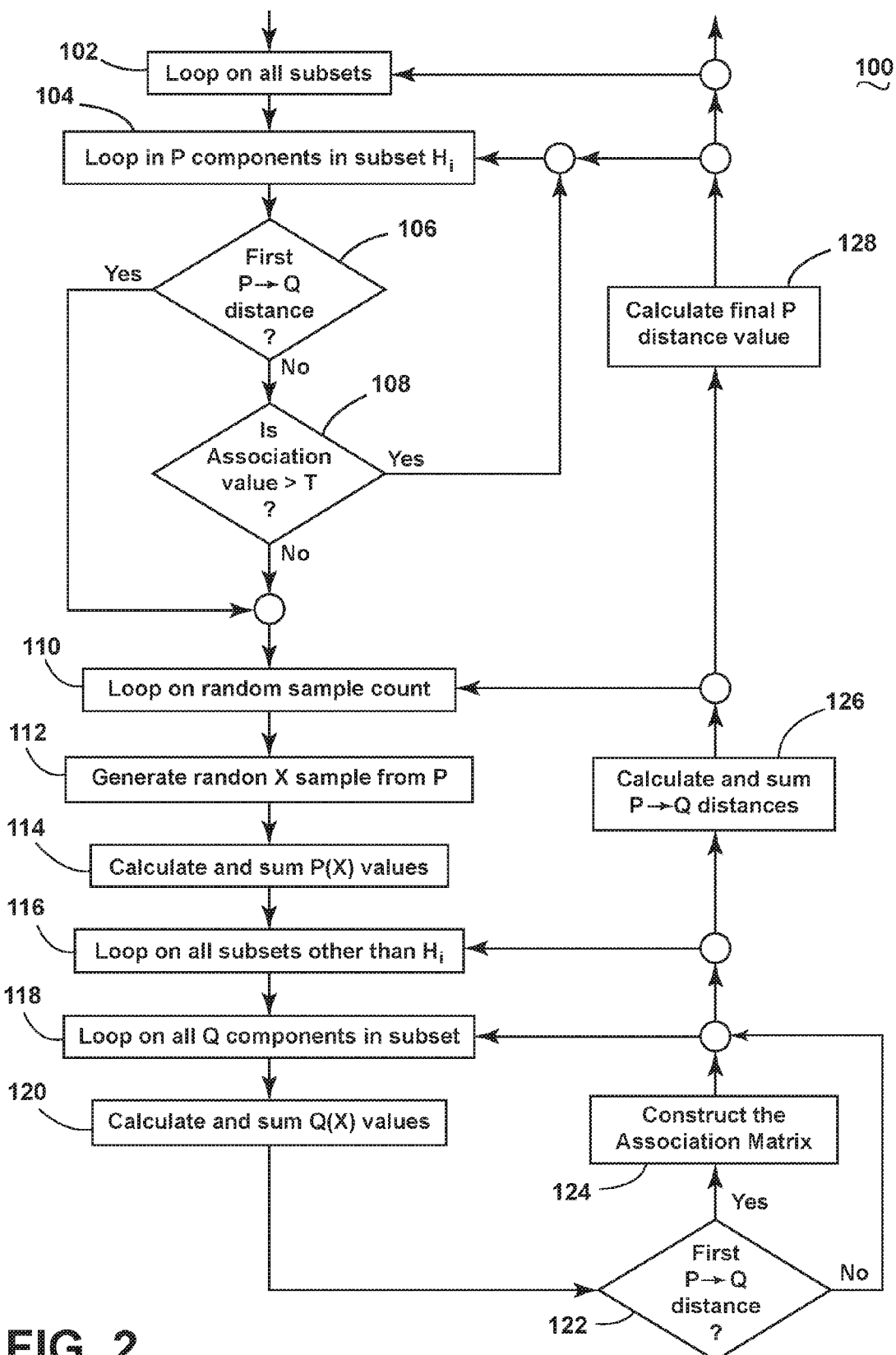
FIG. 2 shows a flowchart detailing a distance calculation and generation of an association matrix for removing abnormal data components from a probabilistic graphical model such as FIG. 1 according to an embodiment of the present invention.

Referring now to FIG. 2, a processor of the method 100 of the present invention will perform a loop on the subsets at step 102. Each subset is selected in turn by entering evidence on the subset variables. As indicated above, the method, as described herein is applied to hard evidence which ensures each subset maps to one or more values of L but these values of L do not map to any other subset. However, the method may apply equally in the presence of soft evidence and therefore should not be considered to be limited to applications where only hard evidence is available. Hard evidence simply means that a single value for each subset variable is selected. Hard evidence on the subset variables defines a single subset. The variable L will contain one or more components dedicated to the selected subset. The parameters of the features conditioned on the active components are then learned. The evidence on the subset variables defines a partition in the training data. The evidence is used to construct a query so that the data associated with the partition can be retrieved for training. Training can utilize any appropriate method such as expectation maximization.

The way in which the model is structured means that there are feature parameters associated with each component of L. For example, a continuous feature will have a mean and variance for each value of L, and a weight for each associated continuous feature. A discrete feature will have probabilities distributed over its values for each component of L. These probabilities are the parameters for discrete features.

As described above, the number of components dedicated to a subset can vary based upon a computational search for the optimum number of components during the learning phase of the model building process. However, determining the optimum number of components is typically a heuristic process. Standard heuristics for the optimum determination aim to trade off model quality with model size and include well-known measures such as Akaike information criterion, Bayesian information criterion and deviance information criterion. In this context, model quality normally refers to the model being a good generator of the data. In other words, data sampled from the model would be similar to the training data. Model quality and model size need to be traded to prevent overfitting of the data. That is, a model may perfectly represent the training data if there are no bounds on its size; however, such a model would not generalize well or form a good representation of the true probabilistic model that generated the data.

Removing components from L is potentially the most computationally expensive phase of model building. The computational time grows exponentially with model size (i.e. number of L components). To mitigate this exponential growth, additional calculations may be performed initially and a method of bookkeeping is defined that saves repeating unnecessary calculations.

The processor detects components in L that are considered most dissimilar to other components and these components are then assumed to be the most likely components associated with anomalies in the training data. These components are candidates for removal. The processor measures the similarity between components using a distance metric. During the removal process, each component is examined and its distance calculated. When the distances have been calculated for all components, the components are ranked in descending order of distance. The component at the top of the list is removed.

Removing a component potentially changes all of the distances for the components still in the model because the model has changed with the removal of the component. Typically, the default position is to recalculate the distances for all remaining components following the removal of a component. This default method is computationally very expensive for large models.

A simple alternative approach is to remove more than one component in a single shot following the initial distance calculations, including the possibility of removing all the components initially determined to be deleted. While this approach may be sufficient for some applications, this may result in masked and undetected anomalous components. For example, multiple anomalous components may provide support to each other when their distances are calculated because they occupy the same area of feature space. Consequently, the approach may not target some anomalous components for deletion.

Denoting the component whose distance is to be calculated as P, the processor calculates the distance by comparing P to a set of other components that is denoted as Q. The membership of Q is determined by the subset variables.

If there are no subset variables, the default membership of Q is all components except P. In this situation, the processor calculates the distance for P using all other components. However, when subset variables are present, a subset $H_i$ is defined by entering evidence for each subset variable. The default position is to enter hard evidence with the result that $H_i$ will be associated with one or more components of L and these components will not be shared by any other subset. In other words, the intersection of $H_i$ with all other subsets is the null (or empty) set. The Q set will be all components of L not in $H_i$. The processor will set P to be the first component in $H_i$ and P will always contain a single component. Each component in $H_i$ will be assigned, in turn, to P when calculating its distance. To summarize this scenario, the distance for component P is calculated by comparing P to all other components that do not share the same subset as P.

As previously described, evidence on subset variables is usually hard but it could be soft. Soft evidence results in a probabilistic distribution over the values of a subset variable. Suppose variable $S_i$ has values $\{a, b, c, d, e\}$. With hard evidence, the processor only selects one value; that is, $S_i$ is assigned to a single value. With soft evidence, the processor may assign multiple values such as $\{a=0, b=0.5, c=0.3, d=0, e=0.2\}$. With soft evidence, the processor performs similar calculations to the scenario with hard evidence but each member of Q has an associated weighting that is factored into the distance calculations.

Distances are calculated using likelihood scores. Inference in the model is performed by entering evidence on the features (recall that features are the X variables 12, 14, 16 in FIG. 1). The likelihood of evidence is a standard measure in probabilistic models and is described in further detail in C. M. Bishop in Chapter 8 of Pattern Recognition and Machine Learning, Springer, (2006).

By looping over a random sample count at step 110, the processor generates n samples from component P at step 112. The parameter n is configurable but a preferred default value is 100. The sample generation produces simulated values for the features. The processor calculates the distance at step 128 by computing the likelihood of the sample data from P's perspective and comparing that to the computed likelihood from Q's perspective.

Specifically, as shown at step 110, the processor takes each sample in turn, looping on the sample count. The processor calculates the P-likelihood by setting the evidence on the X variables at step 114 and selecting the value of L corresponding to P. By looping through all subsets other than $H_i$ at step 116 and all Q components in the subset at step 118, the processor calculates the Q-likelihood by removing evidence on L and entering evidence on each S variable such that only Q variables in L are active. The Q-likelihood is normalized by dividing its likelihood by the cardinality of Q (i.e. the number of Q members). The log of Q is subtracted from the log of P. The processor repeats the steps of 112-126 for the remaining samples and sums the log differences to determine the distance for P at step 128.

There is no fixed method for deciding how many components from L to remove. For some applications, a priori knowledge will determine the quality of a model. The default method for deciding on the number of components to remove is to make an estimate, through either exploration or knowledge, of the percentage of training data associated with anomalies. Each component on L has a measure of support that specifies the number of training cases associated with a component. A parameter called 'percentage removed' is tracked as components are removed from the model. Every time a component is removed, its support is added to the 'percentage removed'. Component removal stops when this 'percentage removed' is the same as or exceeds the estimated number of anomalies.

As explained previously, the default position is to remove components iteratively. To save the exponential growth in computation time as models grow in size, the processor employs a bookkeeping method to identify potentially redundant calculations.

For the majority of models, it is expected that most components in Q will have either no or negligible effect on the distance for the component in P. Consequently, the processor determines whether a P component's distance needs to be recalculated following the removal of a Q component. The processor maintains a table of associations between P components and Q components at step 124. If the association is weak, the processor determines at step 108 that no recalculation is required. The definition of weak is declared in a parameter called 'association threshold' denoted as T in step 108. The value of association threshold determines how many calculations need to be made and therefore the time it takes to build models.

The actual value of the threshold will depend on the application and how the threshold is to be used. For example, the processor may use the association threshold to restrict the time it takes to build models and this type of threshold goal can be automatically determined by building some initial models. If the purpose of the association threshold is to trade identifying the optimum candidate components for removal with the time it takes to calculate, this too can be determined automatically by building some initial models. For applications where data tend to concentrate on several distinct regions of feature space, there will generally be a clear profile of association between P and members of Q. If the data tend to concentrate in a particular region such that the association between P and members of Q tends towards a uniform distribution then removing components may either serve little purpose or a single shot removal (as described above) is sufficient.

The association between P and members of Q will potentially change as components are removed. The associations may be updated periodically but preferably the processor calculates them once when the initial distances are calculated as shown in step 122.

With regard to the construction of the association matrix in step 124, the association measure is a simple probability measure. The samples generated from cluster P are used to find the association between P and members of Q. The association calculation is constructed from a subset of calculations for the distance. The probability density function (pdf) for a component composed of Gaussian and Multinomial variables is well defined. The pdf is calculated for each sample generated by P and each member of Q. The Q pdfs are then normalized by dividing each Q pdf by the sum of Q pdfs to generate a probability of membership to each member of Q. This is repeated for each sample at step 118 and the Q probabilities summed in step 120. The summation over the samples is the measure of association between P and members of Q.

Because each component is iteratively selected as the P component, the processor computes a matrix of associations between each component and all other components that do not occupy the same subset as the P component. The association matrix may be organized with Q as columns and P as rows. Each component will appear in a row and a column. The matrix will have empty values where the row and column values intersect on the same subset. When the processor removes a component, it identifies the Q column in the association matrix relating to the component. The processor may recalculate the distance of P component whose entry in this column exceeds the association threshold. The processor will not recalculate the P components with values below or equal to the association threshold.

Thus, the complete association matrix is generated during the distance calculations required to determine the first component removal. The association matrix then remains static for all future calculations though for some application the model may benefit from occasional updating of this matrix. The processor indexes the association matrix to determine if the distance values have to be recalculated for subsequent component removals.

For many model types, the build time can reduce dramatically often on the order of a 90% reduction in computation time. The time savings is significant for large applications. For a state of the art desktop computer, it may take several hours up to several days to build a model. However, using the method described above, these models may now be built in much less time. Additional time savings are realized by using techniques known for parallel processing.

To more fully appreciate the significance of the saving in time, consider what happens in a typical application. Usually, an application will rely on many models, perhaps 100 or more. If a domain has many asset types; for example, different types of engines, the number of models can grow into the thousands. As the historical data updates, these models will also update periodically. For a new application, there is usually a requirement to explore many different models (e.g. using different combinations of features) to find the optimal set. This exploration is only viable when models can be built relatively quickly.

Constructing anomaly models with subset variables often proves very useful and may provide a number of advantages. Construction of the subset models is very fast (i.e. computationally efficient). Subsets tend to force modeling resources or components to areas of the feature space that are often overlooked and, consequently, provide opportunities for components to fit anomalous data. Therefore, the modeling approach is more robust to training with data that contain hidden anomalies. Subsets also provide a great deal of flexibility for inference. For instance, consider a model with subsets dedicated to each engine fitted to a specific aircraft tail number. Using subsets, it is possible to infer how an engine/aircraft is behaving compared to the rest of the fleet. It is also possible using the same model to track the change in behavior of an individual engine/aircraft. The subsets also provide a built-in platform to perform cross validation when testing model performance.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method of constructing a probabilistic graphical model of a system from data that includes both normal and anomalous data, the method comprising: learning parameters of a structure for the probabilistic graphical model wherein the structure includes at least one latent variable on which other variables are conditional, and the latent variable having a plurality of components, the structure further including at least one subset variable, the at least one subset variable used to explicitly describe at least one expected mode, wherein the at least one latent variable is conditional on the at least one subset variable; iteratively associating one or more of the plurality of components of the latent variable with normal data; constructing a matrix of the associations; detecting abnormal components of the latent variable based on one of a low association with the normal data or the matrix of associations; and deleting the abnormal components of the latent variable from the probabilistic graphical mode; wherein the step of learning the parameters of the structure is performed by Expectation Maximization; wherein the step of iteratively associating one or more of the plurality of components is performed by calculating the similarity between the one or more components, and wherein the step of learning the parameters of the structure further evidence on the at least one subset variable, and querying the subset variables to retrieve at least one learning datum.

2. The method of claim 1, wherein the similarity between the one or more components is calculated with a distance measure.

3. The method of claim 2, wherein the distance measure is a likelihood function.

4. The method of claim 1, wherein the step of iteratively associating one or more of the plurality of components is repeated when new data is present.

5. The method of claim 4, wherein the step of deleting the abnormal components further includes indexing the matrix of associations between each of the one or more components to determine if the step of iteratively associating one or more of the plurality of components of the latent variable with normal data needs to be repeated.

6. The method of claim 5, wherein data representing the abnormal components occupies regions of sparse density.

7. The method of claim 6, wherein data representing normal behavior occupy dense regions.

8. The method of claim 1, wherein the step of learning the parameters of the structure further comprises:
constructing at least one query using at least one of hard evidence and soft evidence on the at least one subset variable, the at least one of hard evidence and soft evidence defining a partition in at least one set of training data.

9. The method of claim 8, wherein the at least one of hard evidence and soft evidence is used to construct a query so that the at least one set of training data can be retrieved for training.

10. The method of claim 1, wherein the at least one subset variable represents an aircraft tail number.

11. The method of claim 1, wherein the matrix of associations further comprises at least one continuous feature and at least one discrete feature.

12. The method of claim 11, wherein the at least one discrete feature is assumed to be conditionally independent when the value of the at least one latent variable is known.

13. The method of claim 12, wherein the at least one continuous feature will have a mean and variance for each value of the at least one latent variable.

14. The method of claim 13, wherein the at least one continuous feature will have a weight for each value of the at least one latent variable.

15. The method of claim 12, wherein the at least one discrete feature will have probabilities distributed over its values for each value of the at least one latent variable.

16. A method of constructing a probabilistic graphical model of a system from data that includes both normal and anomalous data, the method comprising: learning parameters of a structure for the probabilistic graphical model wherein the structure includes at least one latent variable on which other variables are conditional, and the latent variable having a plurality of components, the structure further including at least one subset variable, the at least one subset variable used to explicitly describe at least one expected mode, wherein the at least one latent variable is conditional on the at least one subset variable; iteratively associating one or more of the plurality of components of the latent variable with normal data; constructing a matrix of the associations; detecting abnormal components of the latent variable based on one of a low association with the normal data or the matrix of associations; and deleting the abnormal components of the latent variable from the probabilistic graphical model; wherein the matrix of associations further corn rises at least one continuous feature and at least one discrete feature; wherein the at least one discrete feature is assumed to be conditionally independent when the value of the at least one latent variable is known, wherein the at least one continuous feature will have a mean and variance for each value of the at least one latent variable, and wherein the at least one continuous feature will have a weight for each value of the at least one latent variable.

17. The method of claim 16, wherein the at least one discrete feature will have probabilities distributed over its values for each value of the at least one latent variable, and
   wherein the at least one subset variable represents an aircraft tail number.

* * * * *